(12) United States Patent
Skorka et al.

(10) Patent No.: US 12,375,829 B2
(45) Date of Patent: Jul. 29, 2025

(54) BLOOMING ARTIFACT ELIMINATION IN HIGH DYNAMIC RANGE IMAGING

(71) Applicant: SEMICONDUCTOR COMPONENTS INDUSTRIES, LLC, Scottsdale, AZ (US)

(72) Inventors: Orit Skorka, Santa Clara, CA (US);
Barry Vanhoff, Corvallis, OR (US);
Radu Ispasoiu, Saratoga, CA (US);
Grady Anderson, Boise, ID (US);
Anthony Richard Huggett, Tadley (GB)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 65 days.

(21) Appl. No.: 18/500,361

(22) Filed: Nov. 2, 2023

(65) Prior Publication Data
US 2025/0150728 A1    May 8, 2025

(51) Int. Cl.
*H04N 25/589* (2023.01)
*H04N 23/73* (2023.01)
*H04N 23/741* (2023.01)
*H04N 25/59* (2023.01)
*H04N 25/621* (2023.01)
*H04N 25/78* (2023.01)

(52) U.S. Cl.
CPC ......... *H04N 25/589* (2023.01); *H04N 23/73* (2023.01); *H04N 23/741* (2023.01); *H04N 25/59* (2023.01); *H04N 25/621* (2023.01); *H04N 25/78* (2023.01)

(58) Field of Classification Search
CPC .... H04N 25/589; H04N 23/73; H04N 23/741; H04N 25/59; H04N 25/621; H04N 25/78
See application file for complete search history.

(56) References Cited

U.S. PATENT DOCUMENTS

| | | |
|---|---|---|
| 6,297,889 B1 | 10/2001 | Loce et al. |
| 10,554,902 B2 * | 2/2020 | Lee .................. H04N 5/145 |
| 2003/0128893 A1 | 7/2003 | Castorina et al. |

(Continued)

FOREIGN PATENT DOCUMENTS

| | | |
|---|---|---|
| DE | 102012007838 A1 | 11/2012 |
| DE | 202018105975 U1 | 1/2019 |
| EP | 1947842 B1 | 10/2017 |

*Primary Examiner* — Nhan T Tran
(74) *Attorney, Agent, or Firm* — Dickinson Wright PLLC; Jonathan A. Schnayer (57) ABSTRACT

Image sensors, imaging systems, and methods for eliminating blooming artifacts in high dynamic range imaging. The image sensor includes a pixel array and a controller. The controller is configured to detect that a first pixel signal is at or below a barrier value. The first pixel signal is generated during a first exposure. The controller is also configured to compare neighboring pixel signals to the barrier value. The controller is further configured to determine a first image value for the center pixel based on a second pixel signal when at least one of the neighboring pixel signals is above the barrier value. The second pixel signal is generated during a second exposure that is shorter than the first exposure. The controller is also configured to set the first image value to the first pixel signal when each of the neighboring pixel signals is at or below the barrier value.

20 Claims, 10 Drawing Sheets

(56) References Cited

U.S. PATENT DOCUMENTS

| | | |
|---|---|---|
| 2012/0194686 A1 | 8/2012 | Lin et al. |
| 2012/0219235 A1* | 8/2012 | Solhusvik .................. G06T 5/50 |
| | | 382/275 |
| 2013/0033616 A1* | 2/2013 | Kaizu ................... H04N 25/583 |
| | | 348/222.1 |
| 2013/0051700 A1 | 2/2013 | Jo |
| 2016/0330391 A1* | 11/2016 | Bulteel ................. H04N 25/623 |
| 2021/0360139 A1* | 11/2021 | McElvain ............. H04N 25/583 |
| 2023/0388654 A1* | 11/2023 | Dey ...................... H04N 23/741 |

* cited by examiner

BLOOMING ARTIFACT ELIMINATION IN HIGH DYNAMIC RANGE IMAGING

BACKGROUND

Image sensors are used in electronic devices such as cellular telephones, cameras, and computers to capture images. In particular, an electronic device is provided with an array of image sensor pixels arranged in a grid pattern. Each image sensor pixel receives incident photons, such as light, and converts the photons into electrical signals. Column circuitry is coupled to each column for reading out sensor signals from each image sensor pixel.

SUMMARY

High dynamic range (HDR) images can be created by combining pixel signals generated by image sensor pixels during two reads with different exposure durations. In some cases, when the image sensor pixels with the highest responsivity to the spectrum of incident light become saturated, there is charge spill to neighboring image sensor pixels. The spilled charge (sometimes referred to as blooming or blooming charge) introduces non-linearity to the signals of the affected pixels and can result in undesirable image artifacts (sometimes referred to as blooming artifacts) being included in HDR images. Thus, the present disclosure provides image sensors, imaging systems, and methods that, among other things, eliminates or mitigates blooming artifacts in HDR imaging by detecting image sensor pixels that are likely affected by blooming and replacing their long exposure signals with different signals that are determined based on their short exposure signals.

The present disclosure provides an image sensor including, in one implementation, a pixel array and a controller. The pixel array includes a plurality of image sensor pixels. The controller is configured to detect that a first pixel signal is at or below a barrier value. The first pixel signal is generated by a center pixel of the plurality of image sensor pixels during a first exposure duration. The controller is also configured to compare a plurality of neighboring pixel signals to the barrier value. The plurality of neighboring pixel signals are generated during the first exposure duration. The controller is further configured to determine a first image value for the center pixel based on a second pixel signal when at least one of the plurality of neighboring pixel signals is above the barrier value. The second pixel signal is generated by the center pixel during a second exposure duration that is shorter than the first exposure duration. The controller is also configured to set the first image value to the first pixel signal when each of the plurality of neighboring pixel signals is at or below the barrier value.

The present disclosure also provides an imaging system including, in one implementation, a lens system, an image sensor, and an imaging controller. The image sensor is in operational relationship with the lens system. The image sensor includes a pixel array including a plurality of image sensor pixels. The imaging controller is configured to detect that a first pixel signal is at or below a barrier value. The first pixel signal is generated by a center pixel of the plurality of image sensor pixels during a first exposure duration. The imaging controller is also configured to compare a plurality of neighboring pixel signals to the barrier value. The plurality of neighboring pixel signals are generated during the first exposure duration. The imaging controller is further configured to determine a first image value for the center pixel based on a second pixel signal when at least one of the plurality of neighboring pixel signals is above the barrier value. The second pixel signal is generated by the center pixel during a second exposure duration that is shorter than the first exposure duration. The imaging controller is also configured to set the first image value to the first pixel signal when each of the plurality of neighboring pixel signals is at or below the barrier value.

The present disclosure further provides a method for eliminating blooming artifacts in high dynamic range imaging. The method includes detecting that a first pixel signal is at or below a barrier value. The first pixel signal is generated by a center pixel of a plurality of image sensor pixels included in a pixel array during a first exposure duration. The method also includes comparing a plurality of neighboring pixel signals to the barrier value. The plurality of neighboring pixel signals are generated during the first exposure duration. The method further includes determining a first image value for the center pixel based on a second pixel signal when at least one of the plurality of neighboring pixel signals is above the barrier value. The second pixel signal is generated by the center pixel during a second exposure duration that is shorter than the first exposure duration. The method also includes setting the first image value to the first pixel signal when each of the plurality of neighboring pixel signals is at or below the barrier value.

BRIEF DESCRIPTION OF THE DRAWINGS

For a detailed description of example implementations, reference will now be made to the accompanying drawings in which.

DEFINITIONS

Various terms are used to refer to particular system components. Different companies may refer to a component by different names—this document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

Terms defining an elevation, such as "above," "below," "upper", and "lower" shall be locational terms in reference to a direction of light incident upon a pixel array and/or an image pixel. Light entering shall be considered to interact with or pass objects and/or structures that are "above" and "upper" before interacting with or passing objects and/or structures that are "below" or "lower." Thus, the locational terms may not have any relationship to the direction of the force of gravity.

In relation to electrical devices, whether stand alone or as part of an integrated circuit, the terms "input" and "output" refer to electrical connections to the electrical devices, and shall not be read as verbs requiring action. For example, a differential amplifier, such as an operational amplifier, may have a first differential input and a second differential input, and these "inputs" define electrical connections to the operational amplifier, and shall not be read to require inputting signals to the operational amplifier.

"Assert" shall mean changing the state of a Boolean signal. Boolean signals may be asserted high or with a higher voltage, and Boolean signals may be asserted low or with a lower voltage, at the discretion of the circuit designer. Similarly, "de-assert" shall mean changing the state of the Boolean signal to a voltage level opposite the asserted state.

"Light" or "color" shall mean visible light ranging between about 380 and 700 nanometers (nm). "Light" or "color" shall also mean invisible light, such as infrared light ranging between about 800 nm and 1 millimeter. "Light" or "color" shall also mean invisible light, such as ultraviolet light ranging between about 100 to 400 nm.

"Controller" shall mean, alone or in combination, individual circuit components, an application specific integrated circuit (ASIC), one or more microcontrollers with controlling software, a reduced-instruction-set computer (RISC) with controlling software, a digital signal processor (DSP), one or more processors with controlling software, a programmable logic device (PLD), a field programmable gate array (FPGA), or a programmable system-on-a-chip (PSOC), configured to read inputs and drive outputs responsive to the inputs.

DETAILED DESCRIPTION

The following discussion is directed to various implementations of the invention. Although one or more of these implementations may be preferred, the implementations disclosed should not be interpreted, or otherwise used, as limiting the scope of the present disclosure, including the claims. In addition, one skilled in the art will understand that the following description has broad application, and the discussion of any implementation is meant only to be exemplary of that implementation, and not intended to intimate that the scope of the present disclosure, including the claims, is limited to that implementation.

Various examples are directed to systems and methods for eliminating blooming artifacts in high dynamic range (HDR) imaging. More particularly, various examples are directed to image sensors and related imaging systems that detect when image sensor pixels are likely affected by blooming based on pixel signals of neighboring image sensor pixels. More particularly still, various examples are directed to image sensors and related imaging systems that replace the long exposure signals generated by image sensor pixels affected by blooming with different signals that are determined based on the short exposures signals generated by the image sensor pixels. The specification now turns to an example system to orient the reader.

Figure 1A:
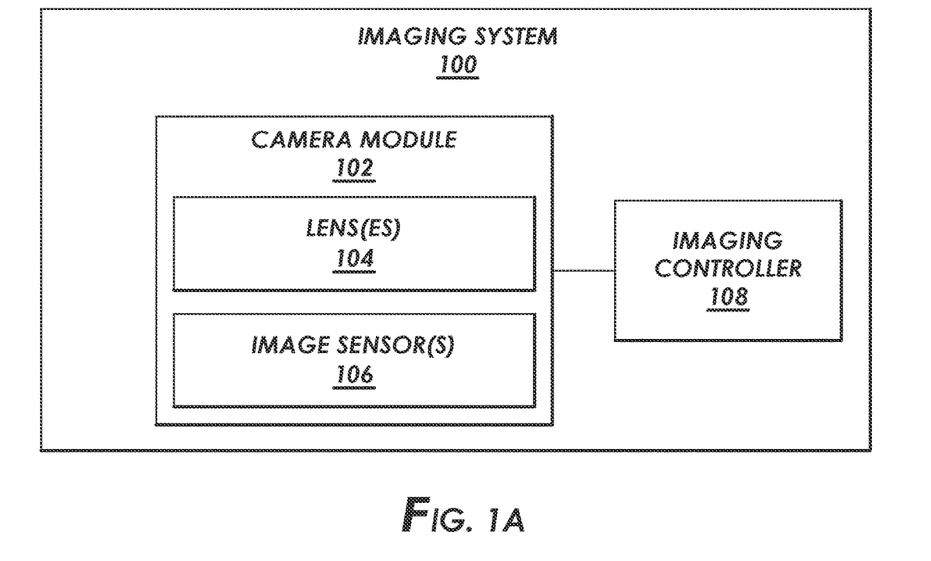
FIG. 1A is a block diagram of an example of an imaging system in accordance with some implementations.

FIG. 1A shows an example of an imaging system 100. In particular, the imaging system 100 may be a portable electronic device such as a camera, a cellular telephone, a tablet computer, a webcam, a video camera, a video surveillance system, or a video gaming system with imaging capabilities. In other cases, the imaging system 100 may be an automotive imaging system. The imaging system 100 illustrated in FIG. 1A includes a camera module 102 that may be used to convert incoming light into digital image data.

The camera module 102 may include one or more lenses 104 and one or more corresponding image sensors 106. The lenses 104 may include fixed and/or adjustable lenses. During image capture operations, light from a scene may be focused onto the image sensor 106 by the lenses 104. The image sensor 106 may comprise circuitry for converting analog pixel data into corresponding digital image data to be provided to the imaging controller 108. If desired, the camera module 102 may be provided with an array of lenses 104 and an array of corresponding image sensors 106.

The imaging controller 108 may include one or more integrated circuits. The imaging circuits may include image processing circuits, microprocessors, and storage devices, such as random-access memory, and non-volatile memory. The imaging controller 108 may be implemented using components that are separate from the camera module 102 and/or that form part of the camera module 102, for example, circuits that form part of the image sensor 106. Digital image data captured by the camera module 102 may be processed and stored using the imaging controller 108. Processed image data may, if desired, be provided to external equipment, such as computer, external display, or other device, using wired and/or wireless communications paths coupled to the imaging controller 108.

Figure 1B:
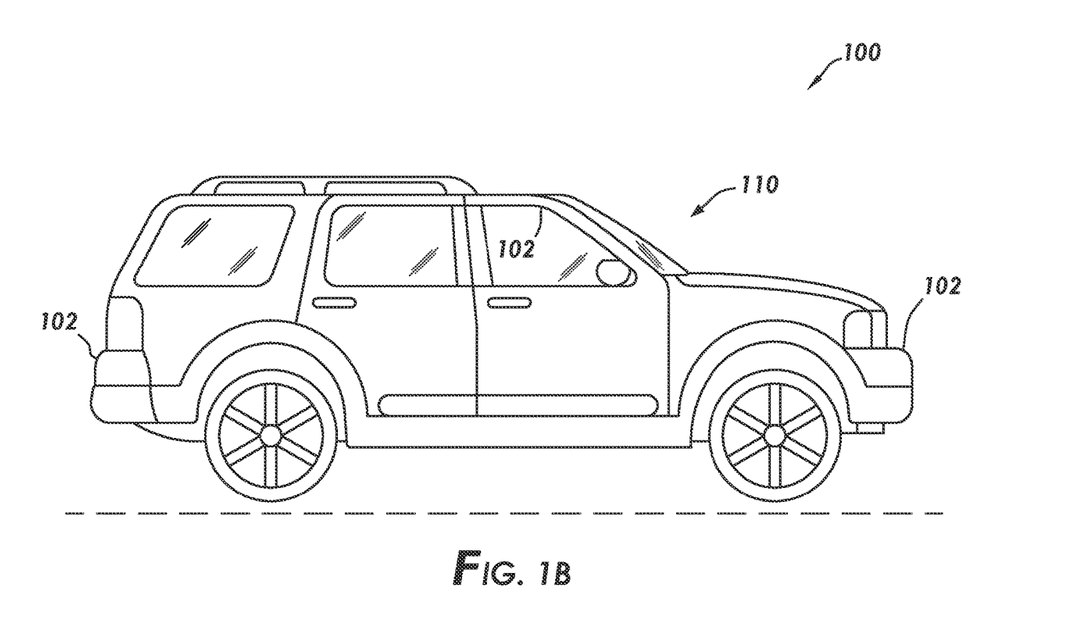
FIG. 1B is a diagram of an example of an imaging system incorporated in a vehicle in accordance with some implementations.

FIG. 1B shows another example of the imaging system 100. The imaging system 100 illustrated in FIG. 1B comprises an automobile or vehicle 110. The vehicle 110 is illustratively shown as a passenger vehicle, but the imaging system 100 may be other types of vehicles, including commercial vehicles, on-road vehicles, and off-road vehicles. Commercial vehicles may include busses and tractor-trailer vehicles. Off-road vehicles may include tractors and crop harvesting equipment. In the example of FIG. 1B, the vehicle 110 includes a forward-looking camera module 102 arranged to capture images of scenes in front of the vehicle 110. Such a forward-looking camera module 102 can be used for any suitable purpose, such as lane-keeping assist, collision warning systems, distance-pacing cruise-control systems, autonomous driving systems, and proximity detection. The vehicle 110 further comprises a backward-looking camera module 102 arranged to capture images of scenes behind the vehicle 110. Such a backward-looking camera module 102 can be used for any suitable purpose, such as collision warning systems, reverse direction video, autonomous driving systems, proximity detection, monitoring position of overtaking vehicles, and backing up. The vehicle 110 further comprises a side-looking camera module 102 arranged to capture images of scenes beside the vehicle 110. Such a side-looking camera module 102 can be used for any suitable purpose, such as blind-spot monitoring, collision warning systems, autonomous driving systems, monitoring position of overtaking vehicles, lane-change detection, and proximity detection. In situations in which the imaging system 100 is a vehicle, the imaging controller 108 may be a controller of the vehicle 110. The discussion now turns in greater detail to the image sensor 106 of the camera module 102.

Figure 2:
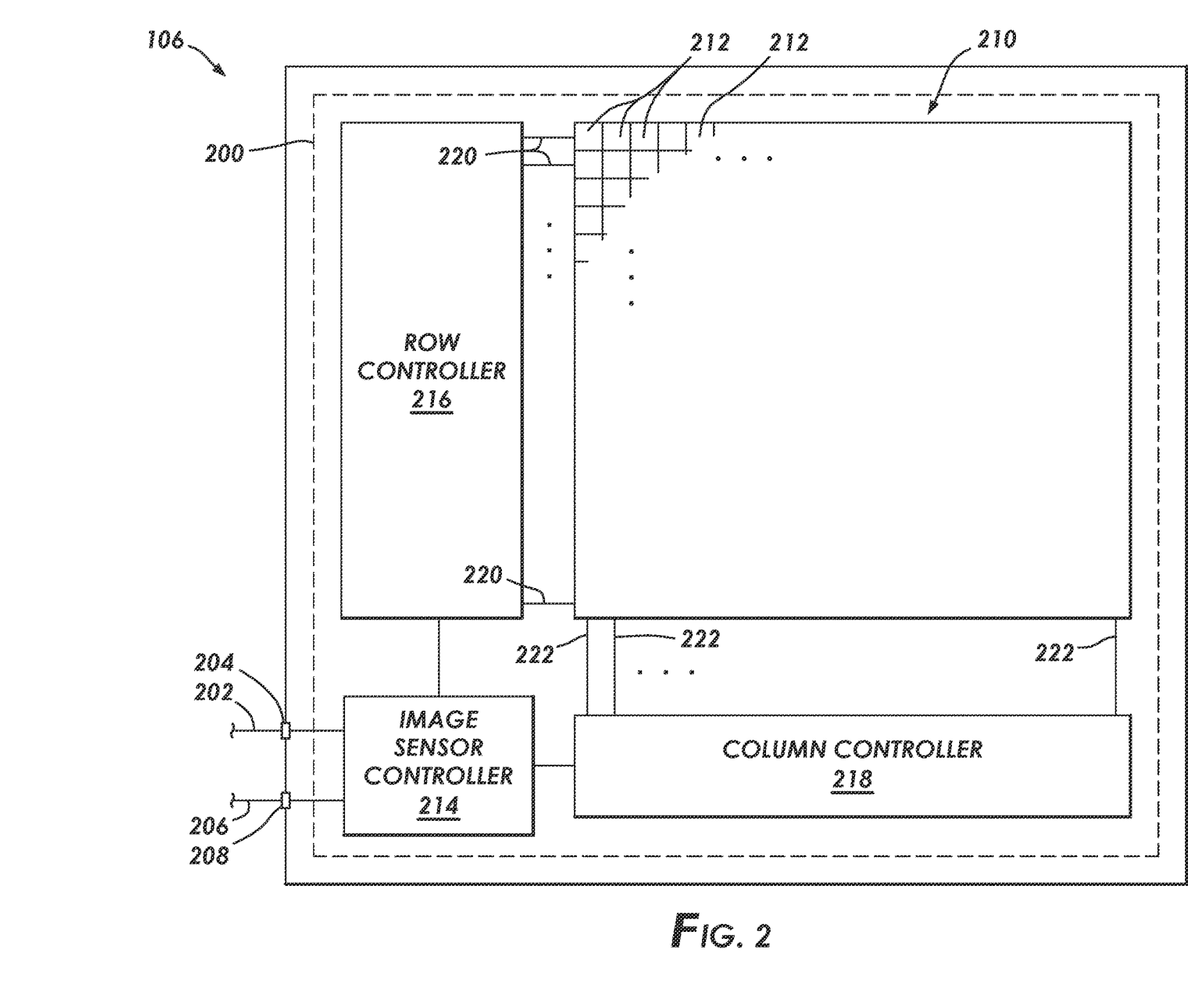
FIG. 2 is a partial schematic and a partial block diagram of an example of an image sensor in accordance with some implementations.

FIG. 2 shows an example of the image sensor 106. In particular, FIG. 2 shows that the image sensor 106 may comprise a substrate 200 of semiconductor material (for example, silicon) encapsulated within packaging to create a packaged semiconductor device or packaged semiconductor product. Bond pads or other connection points of the substrate 200 couple to terminals of the image sensor 106, such as a serial communication channel 202 coupled to a first terminal 204, and a capture input 206 coupled to a second terminal 208. Additional terminals will be present, such as ground, common, or power, but the additional terminals are omitted so as not to unduly complicate the figure. While a single instance of the substrate 200 is shown, in other implementations, multiple substrates may be combined to form the image sensor 106 in a multi-chip module.

The image sensor 106 illustrated in FIG. 2 includes a pixel array 210 with a plurality of image sensor pixels 212 arranged in rows and columns. The pixel array 210, being one example of an "array of pixels," may include, for example, hundreds or thousands of rows and columns of image sensor pixels 212. Control and readout of the pixel array 210 may be implemented by an image sensor controller 214 coupled to a row controller 216 and a column controller 218. The row controller 216 may receive row addresses from the image sensor controller 214 and supply corresponding row control signals to image sensor pixels 212, such as reset, row-select, charge transfer, dual conversion gain, and readout control signals. The row control signals may be communicated over one or more conductors, such as row control paths 220.

The column controller 218 may be coupled to the pixel array 210 by way of one or more conductors, such as column lines 222. Column controllers may sometimes be referred to as column control circuits, readout circuit, or column decoders. The column lines 222 may be used for reading out pixel signals from image sensor pixels 212 and for supplying bias currents and/or bias voltages to image sensor pixels 212. If desired, during pixel readout operations, a pixel row in the pixel array 210 may be selected using the row controller 216 and pixel signals generated by image sensor pixels 212 in that pixel row can be read out along the column lines 222. The column controller 218 may include sample-and-hold circuitry for sampling and temporarily storing pixel signals read out from the pixel array 210, amplifier circuitry, analog-to-digital conversion (ADC) circuitry, bias circuitry, column memory, latch circuitry for selectively enabling or disabling the column circuitry, or other circuitry that is coupled to one or more columns of image sensor pixels 212 in the pixel array 210 for operating the image sensor pixels 212 and for reading out pixel signals from image sensor pixels 212. ADC circuitry in the column controller 218 may convert analog pixel values received from the pixel array 210 into corresponding digital image data. The column controller 218 may supply digital image data to the image sensor controller 214 and/or the imaging controller 108 (FIG. 1A) over, for example, the serial communication channel 202.

Figure 3:
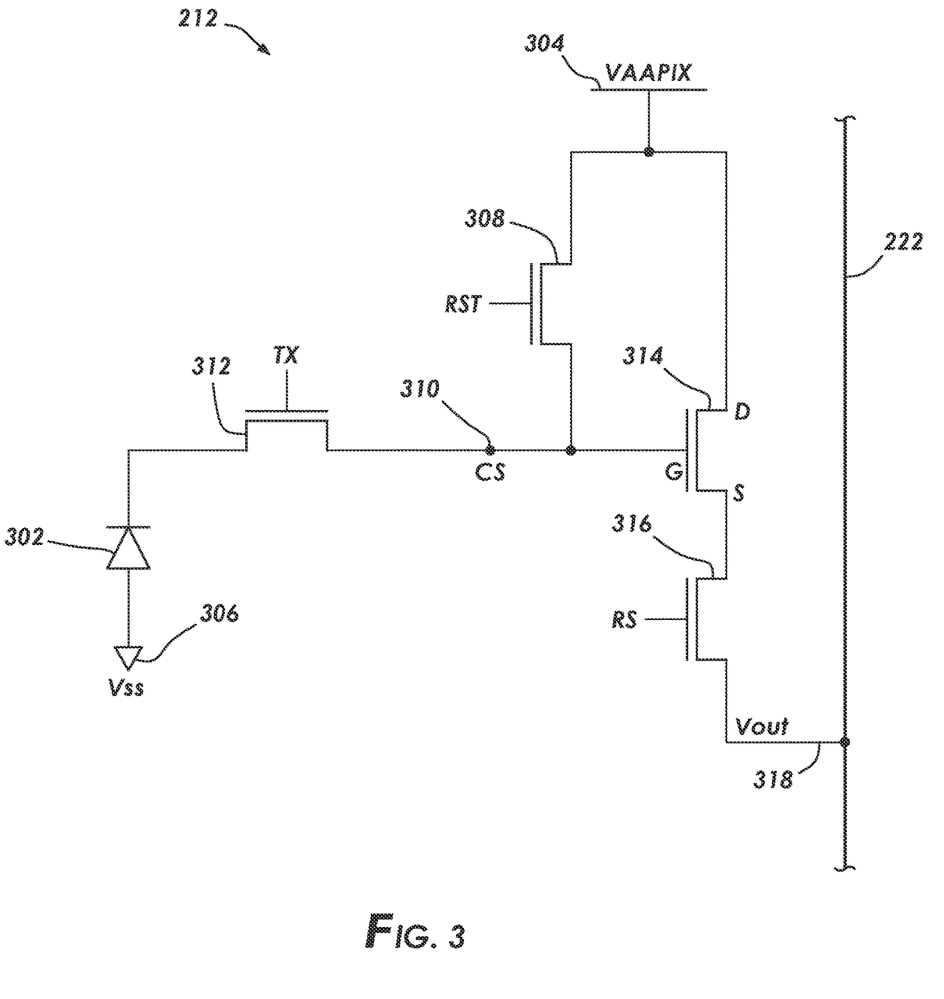
FIG. 3 is a schematic of an example of circuitry in an image sensor pixel in accordance with some implementations.

FIG. 3 shows an example of circuitry in one of the image sensor pixels 212. The image sensor pixels 212 may have fewer, additional, or different components in different configurations than the one illustrated in FIG. 3. In particular, FIG. 3 shows that each of the image sensor pixels 212 may comprise a photodetector 302 (for example, a photodiode). A positive pixel power supply voltage, such as supply voltage VAAPIX, may be supplied at a positive power supply terminal 304. A ground power supply voltage, such a reference voltage Vss, may be supplied at a ground terminal 306. Incoming light is gathered by the photodetector 302, in some cases after the light passes through a color filter structure (not shown). The photodetector 302 converts the light to electrical charge.

Before an image is acquired, a reset control signal RST may be asserted. The reset control signal RST turns on a reset transistor 308 and resets a charge storage (CS) node 310 to a voltage equal or close to the supply voltage VAAPIX. The reset control signal RST may then be de-asserted to turn off the reset transistor 308. After the reset process is complete, a transfer gate control signal TX may be asserted to turn on a transfer transistor 312. When the transfer transistor 312 is turned on, charge generated by the photodetector 302 in response to incoming light is transferred to the charge storage node 310. The charge storage node 310 exhibits a capacitance that can be used to store the charge that has been transferred from the photodetector 302. The signal associated with the charge stored in the charge storage node 310 is buffered by a source-follower transistor 314. A row select transistor 316 connects the source-follower transistor 314 to one of the column lines 222.

When it is desired to read out the value of the charge stored in the charge storage node 310, a control signal RS is asserted. The read-out value may be, for example, the value of the charge storage node 310 that is represented by the signal at the source terminal S of the source-follower transistor 314. When the control signal RS is asserted, the row select transistor 316 is turned on and an output signal Vout that is representative of the magnitude of the charge stored in the charge storage node 310 is produced on an output path 318. The output signal Vout is one example of a "pixel signal." When the control signal RS is asserted, one of the column lines 222 can be used to route the output signal Vout from the image sensor pixel 212 to readout circuitry, such as the column controller 218 in FIG. 2.

Figure 4A:
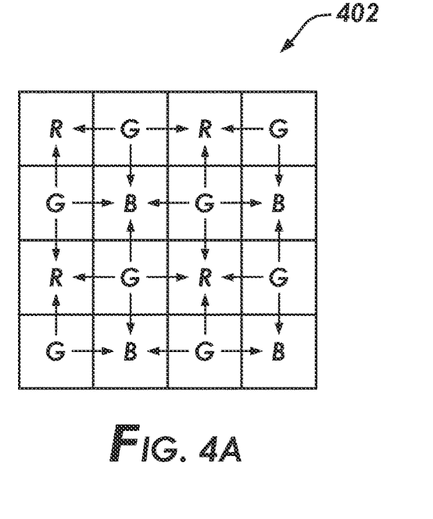
FIG. 4A is an overhead view of an example of a pixel array with a Bayer color filter array under green light in accordance with some implementations.
Figure 4B:
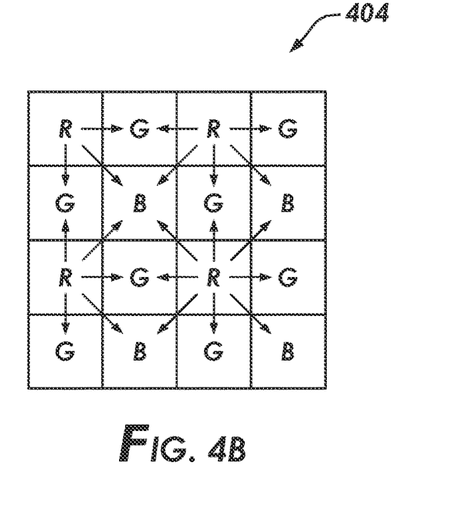
FIG. 4B is an overhead view of an example of a pixel array with a Bayer color filter array under red light in accordance with some implementations.

When the photodetector 302 of one of the image sensor pixels 212 is exposed to incident light, charge begins to accumulate in a photodiode well of the photodetector 302. In some circumstances, more charge may be generated than an amount that the photodetector 302 is capable of holding, such as when one of the image sensor pixels 212 is exposed to extremely bright light. In other words, one of the image sensor pixels 212 becomes saturated when the charge exceeds the full well capacity of its photodetector 302. When one of the image sensor pixels 212 is saturated, there may be charge spill to neighboring pixels. For example, FIG. 4A shows an overhead view of a first array 402 of pixels with a Bayer (red-green-green-blue) color filter array under green light. When the green pixels of the first array 402 become saturated, charge spills to the neighboring red and blue pixels of the first array 402, as illustrated by the arrows in FIG. 4A. As a further example, FIG. 4B shows an overhead view of a second array 404 of pixels with a Bayer color filter array under red light. When the red pixels of the second array 404 are saturated, charge flows to the neighboring green and blue pixels of the second array 404, as illustrated by the arrows in FIG. 4B. The spilled charge (sometimes referred to as blooming or blooming charge) adds to the photo-signal, and, as a result, the pixel signal is no longer proportional to illumination level. As described in more detail below, the non-linearity introduced by blooming charge can result in undesirable image artifacts (sometimes referred to as blooming artifacts) being included in HDR images.

HDR images can be created by combining pixel signals from two reads of the pixel array 210 at different exposure durations. For example, in some implementations, the image sensor 106 may include a digital lateral overflow (DLO) pipeline that determines a combined linearized HDR response based on pixel signals from a long duration read and a short duration read. Pixel signals generated by image sensor pixels 212 that have become saturated are not proportional to illumination. Thus, the DLO pipeline clips pixel signals from the long and short duration reads that are above a predetermined barrier and assumes that pixel signals below the predetermined barrier are proportional to illumination. When affected by blooming, image sensor pixels 212 may generate pixel signals that are lower than the predetermined barrier, but higher than their photo-signal due to, for example, spilled charge from one or more neighboring pixels that have become saturated. Even though they are not proportional to illumination, these pixel signals are not clipped because their values are lower than the predetermined barrier. Thus, a combined HDR image created using these non-linear pixel signals may exhibit color artifacts, especially, after color processing. In other words, blooming can cause color artifacts in combined HDR images. Blooming may also cause fixed-pattern noise (sometimes referred to as "structural noise"), when pixels become saturated at different light levels, such as when there are variations in full well capacity.

Figure 5A:
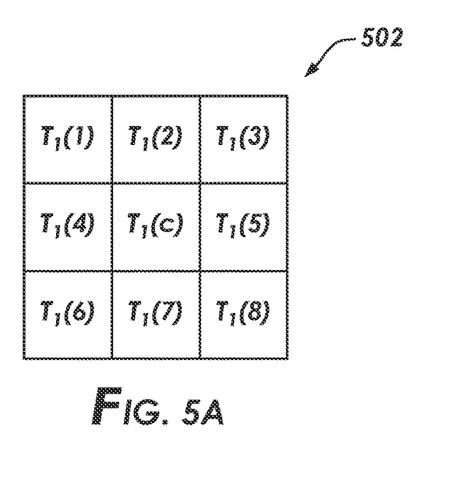
FIG. 5A is a diagram of an example of a long exposure image generated by a portion of a pixel array in accordance with some implementations.
Figure 5B:
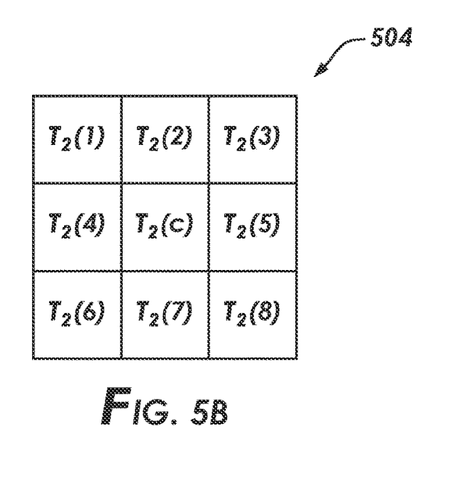
FIG. 5B is a diagram of an example of a short exposure image generated by a portion of a pixel array in accordance with some implementations.

As described above, the DLO pipeline determines a combined linearized HDR response based on pixel signals for long and short reads. FIG. 5A is a diagram of a first time image 502 (sometimes referred to as a "T1 image") generated by a portion of the pixel array 210. FIG. 5B is a diagram of a second time image 504 (sometimes referred to as a "T2 image") generated by a portion of the pixel array 210. The exposure of the second time image 504 (an example of a "second exposure") is lower than the exposure of the first time image 502 (an example of a "first exposure"). Exposure is the product of integration time and light intensity. Thus, in some implementations, the exposure duration of the second time image 504 (an example of a "second exposure duration") is shorter than the exposure duration of the first time image 502 (an example of a "first exposure duration").

Alternatively, or in addition, the image sensor 106 may include one or more attenuation filters to lower the intensity of incident light for the second time image 504. Alternatively, or in addition, the image sensor 106 may use a detector with a smaller area to lower the intensity of incident light for the second time image 504. As described in more detail below, the image sensor 106 is configured to determine when a first pixel signal $T_1(c)$ generated by a center pixel in the first time image 502 is likely affected by blooming based on two or more of a plurality of neighboring pixel signals $T_1(1)$, $T_1(2)$, $T_1(3)$, $T_1(4)$, $T_1(5)$, $T_1(6)$, $T_1(7)$, and $T_1(8)$ generated by a plurality of neighboring pixels in the first time image 502. The center pixel may be any pixel in the pixel array.

Figure 6:
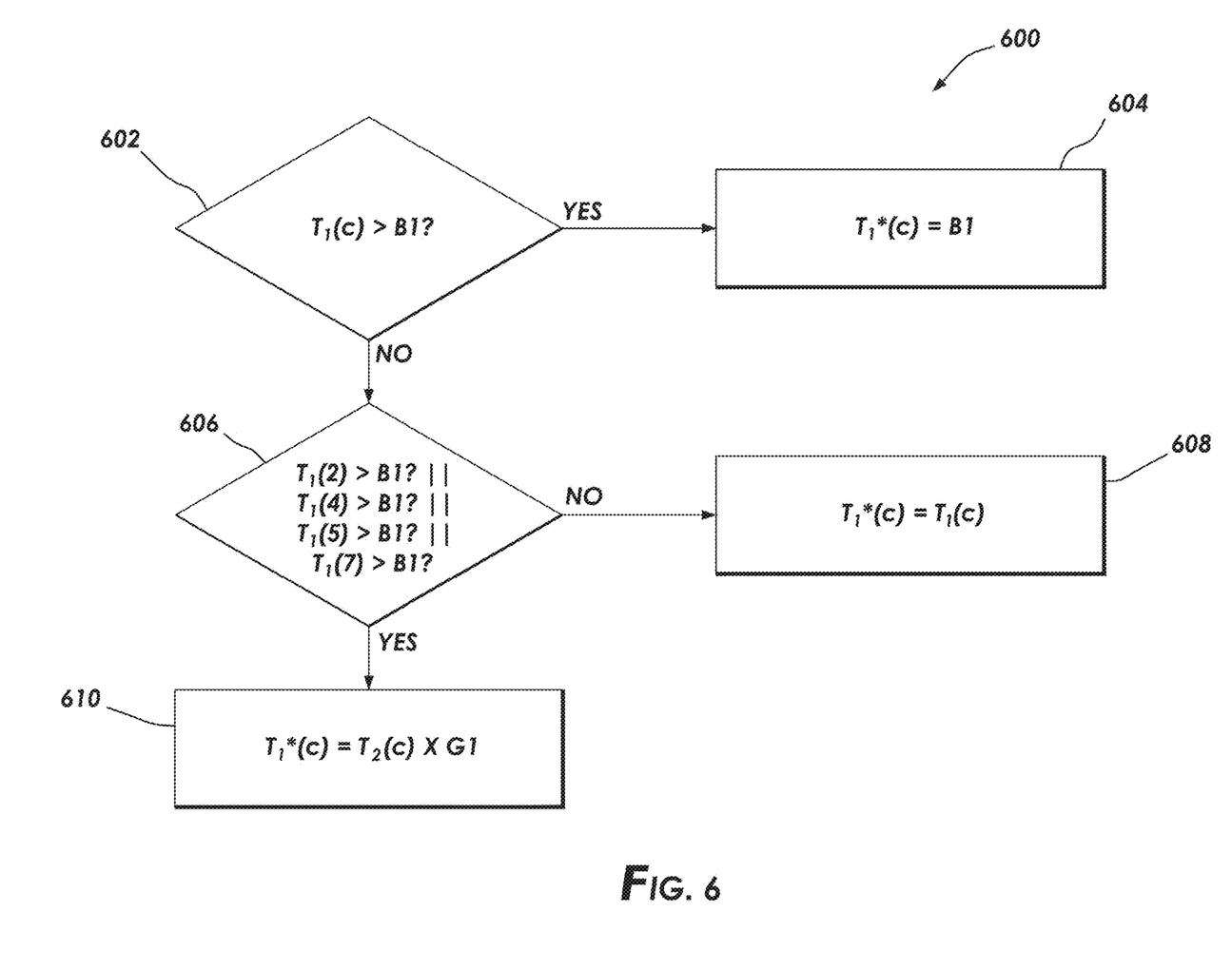
FIG. 6 is a flow diagram of an example of a method for determining a long exposure corrected signal value for an image sensor pixel in accordance with some implementations.

FIG. 6 is a flow diagram of an example of a method 600 for determining a first image value $T_1^*(c)$ for the center pixel in the first time image 502 in accordance with some implementations. For a given pixel array, the method 600 may be performed for one or more pixels in the given pixel array. For simplicity of explanation, the method 600 is depicted in FIG. 6 and described as a series of operations. However, the operations can occur in various orders and/or concurrently, and/or with other operations not presented and described herein.

At block 602, the first pixel signal $T_1(c)$ is compared to a barrier value B1. The first pixel signal $T_1(c)$ is generated by the center pixel in the first time image 502. The barrier value B1 may include a predetermined threshold above which the center pixel may be considered saturated or close to saturation. For example, for an image with a 12-bit data format with maximum signal level of 4,095 digital numbers (DN), the center pixel may become saturated or close to saturation when the first pixel signal $T_1(c)$ is above 3,600 DN, therefore, B1 can be set to 3,600 DN. When the first pixel signal $T_1(c)$ is above the barrier value B1, the first image value $T_1^*(c)$ is set to the barrier value B1 at block 604. Alternatively, when the first pixel signal $T_1(c)$ is at or below the barrier value B1, two or more of the neighboring pixel signals $T_1(1)$, $T_1(2)$, $T_1(3)$, $T_1(4)$, $T_1(5)$, $T_1(6)$, $T_1(7)$, and $T_1(8)$ are compared to the barrier value B1. The neighboring pixel signals $T_1(1)$, $T_1(2)$, $T_1(3)$, $T_1(4)$, $T_1(5)$, $T_1(6)$, $T_1(7)$, and $T_1(8)$ are generated by the neighboring pixels in the first time image 502.

Figure 7A:
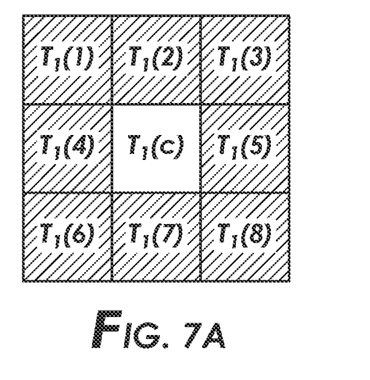
FIGS. 7A through 7E are diagrams of examples of long exposure images with different combinations of neighboring imaging sensor pixels to check in order to determine whether a center pixel is likely affected by blooming in accordance with some implementations.
Figure 7B:
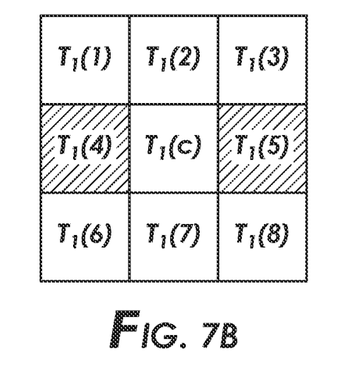
Figure 7C:
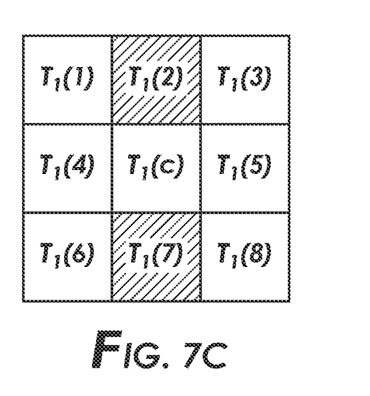
Figure 7D:
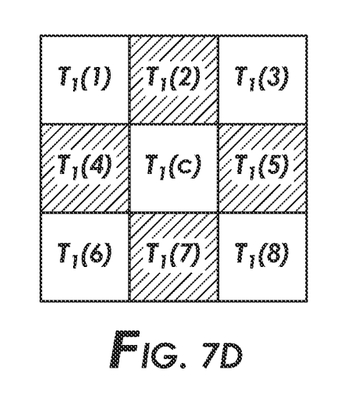
Figure 7E:
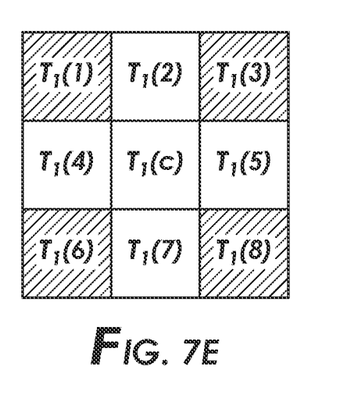

In some implementations, the neighboring pixel signals $T_1(1)$, $T_1(2)$, $T_1(3)$, $T_1(4)$, $T_1(5)$, $T_1(6)$, $T_1(7)$, and $T_1(8)$ generated by all eight of the neighboring pixels are compared to the barrier value B1. For example, as illustrated by shadowing in FIG. 7A, the neighboring pixel signals $T_1(1)$, $T_1(2)$, $T_1(3)$, $T_1(4)$, $T_1(5)$, $T_1(6)$, $T_1(7)$, and $T_1(8)$ generated by all eight of the neighboring pixels may each be compared to the barrier value B1. However, in some situations, the neighboring pixel signals generated by some of the neighboring pixels do not need to be checked. For example, a pixel signal generated by a green pixel may not be affected by blooming when one or more of its neighboring green pixels become saturated. Thus, in some implementations, less than all eight of the neighboring pixel signals $T_1(1)$, $T_1(2)$, $T_1(3)$, $T_1(4)$, $T_1(5)$, $T_1(6)$, $T_1(7)$, and $T_1(8)$ are checked. For example, as illustrated by shadowing in FIG. 7B, the neighboring pixel signals $T_1(4)$ and $T_1(5)$ generated by the two neighboring pixels that are positioned next to the center pixel on the same row as the center pixel may each be compared to the barrier value B1. As a further example, as illustrated by shadowing in FIG. 7C, the neighboring pixel signals $T_1(2)$ and $T_1(7)$ generated by the two neighboring pixels that are positioned next to the center pixel on the rows above and below the center pixel may each be compared to the barrier value B1. As a further example, as illustrated by shadowing in FIG. 7D, the neighboring pixel signals $T_1(2)$, $T_1(4)$, $T_1(5)$, and $T_1(7)$ generated by the four neighboring pixels that are positioned non-diagonally adjacent to the center pixel may each be compared to the barrier value B1. As a further example, as illustrated by shadowing in FIG. 7E, the neighboring pixel signals $T_1(1)$, $T_1(3)$, $T_1(6)$, and $T_1(8)$ generated by the four neighboring pixels that are positioned diagonally adjacent to the center pixel may each be compared to the barrier value B1.

Returning to block 606 in FIG. 6, the neighboring pixel signals $T_1(2)$, $T_1(4)$, $T_1(5)$, and $T_1(7)$ of the four neighboring pixels that are positioned non-diagonally adjacent to the center pixel are each compared to the barrier value B1. When all of the neighboring pixel signals $T_1(2)$, $T_1(4)$, $T_1(5)$, and $T_1(7)$ are at or below the barrier value B1, the first image value $T_1^*(c)$ is set to the value of the first pixel signal $T_1(c)$ at block 608.

Alternatively, when any of the neighboring pixel signals $T_1(2)$, $T_1(4)$, $T_1(5)$, and $T_1(7)$ are above the barrier value B1, the first pixel signal $T_1(c)$ is likely affected by blooming. As described above, pixels that are affected by blooming may generate pixel signals that are not proportional to illumination. However, because the exposure duration of the second time image 504 is less than the exposure duration of the first time image 502, the second pixel signal $T_2(c)$ generated by the center pixel may not be affected by blooming. Thus, when any of the neighboring pixel signals $T_1(2)$, $T_1(4)$, $T_1(5)$, and $T_1(7)$ are above the barrier value B1, the first image value $T_1^*(1)$ is set to the product of the second pixel signal $T_2(c)$ and an exposure ratio G1 at block 610. The exposure ratio G1 may be determined based on the exposure durations and/or gain values of the first time image 502 and the second time image 504. When gain values are the same for the first time image 502 and the second time image 504, the exposure ratio G1 may be the ratio of the exposure duration of the first time image 502 to the exposure duration of the second time image 504. For example, when the exposure duration of the first time image 502 is twice the exposure duration of the second time image 504 and gain value is the same for both images, the exposure ratio G1 may be set to two.

Figure 8:
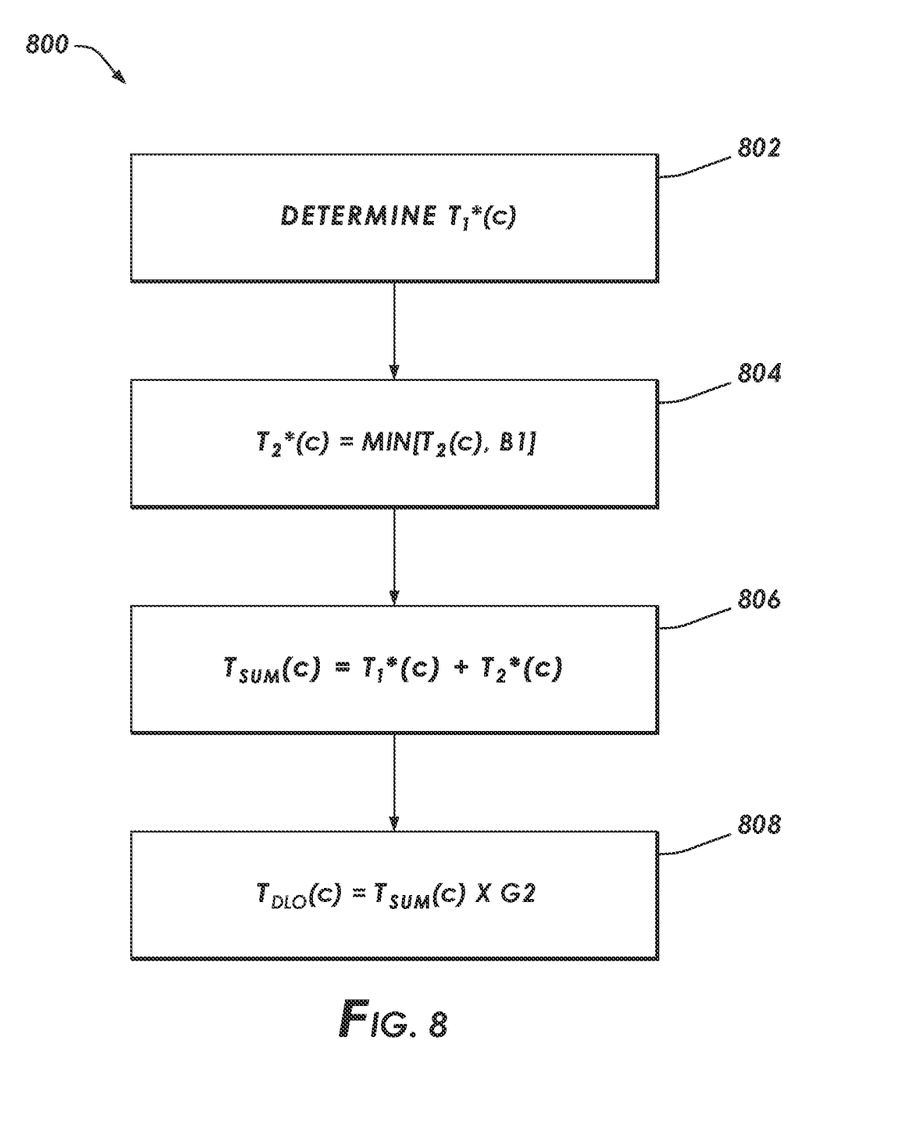
FIG. 8 is a flow diagram of an example of a method for determining a digital lateral overflow value for an image sensor pixel in accordance with some implementations.

FIG. 8 is a flow diagram of an example of a method 800 determining a DLO image value $T_{DLO}(C)$ for the center pixel in the first time image 502 in accordance with some implementations. For a given pixel array, the method 800 may be performed for one or more pixels in the given pixel array. For simplicity of explanation, the method 800 is depicted in FIG. 8 and described as a series of operations. However, the operations can occur in various orders and/or concurrently, and/or with other operations not presented and described herein.

At block 802, the first image value $T_1^*(c)$ is determined. The first image value $T_1^*(c)$ may be determined using any of the methods described herein (including, for example, the method 600 described above). Next, at block 804, a second image value $T_2^*(c)$ is determined as the lower of the second pixel signal $T_2(c)$ and the barrier value B1. At block 806, a summed image value $T_{SUM}(c)$ for a combined HDR image is determined by adding the first image value $T_1^*(c)$ and the second image value $T_2^*(c)$. At block 808, the DLO image value $T_{DLO}(C)$ is determined by multiplying the summed image value $T_{SUM}(c)$ by a gain factor G2. The gain factor G2 may be determined based on the integration time and/or gain values. In some implementations, HDR images are constructed from more than two exposures. When there are N exposures, the $T_1$ to TN-1 images may be treated in a similar manner as image $T_1$ in the two exposure example described herein. The barrier level may not be the same for the $T_1$ to TN-1 images, for example, $B_{1\_1}$ to $B_{1\_N-1}$, and the TN image may be treated in a similar manner as $T_2$ in the two exposure example described herein.

In some implementations, a noise threshold may be implemented to avoid reducing the quality of the resulting HDR image. For example, if the second pixel signal $T_2(c)$ is low, the noise level of the second pixel signal $T_2(c)$ may be high because the noise floor is dominant. Using a low second pixel signal to determine a first image value for one of the image sensor pixels 212 that is affected by blooming may reduce the signal-to-noise ratio (SNR) of the combined HDR image. Thus, a noise threshold may be implemented to avoid using low second pixel signals. In some implementations, the first pixel signal $T_1(c)$ is compared to a noise threshold value B2 to determine when the second pixel signal $T_2(c)$ is low. When the first pixel signal $T_1(c)$ is lower than the noise threshold value B2, the first image value $T_1^*(c)$ may not be determined using the second pixel signal $T_2(c)$ even when one or more of the neighboring pixel signals $T_1(1)$, $T_1(2)$, $T_1(3)$, $T_1(4)$, $T_1(5)$, $T_1(6)$, $T_1(7)$, and $T_1(8)$ are above the barrier value B1. Rather, the first image value $T_1^*(c)$ may be set to the value of the first pixel signal $T_1(c)$ when the first pixel signal $T_1(c)$ is below the noise threshold value B2 and one or more of the neighboring pixel signals $T_1(1)$, $T_1(2)$, $T_1(3)$, $T_1(4)$, $T_1(5)$, $T_1(6)$, $T_1(7)$, and $T_1(8)$ are above the barrier value B1. The noise threshold value B2 is less than the barrier value B1.

Figure 9:
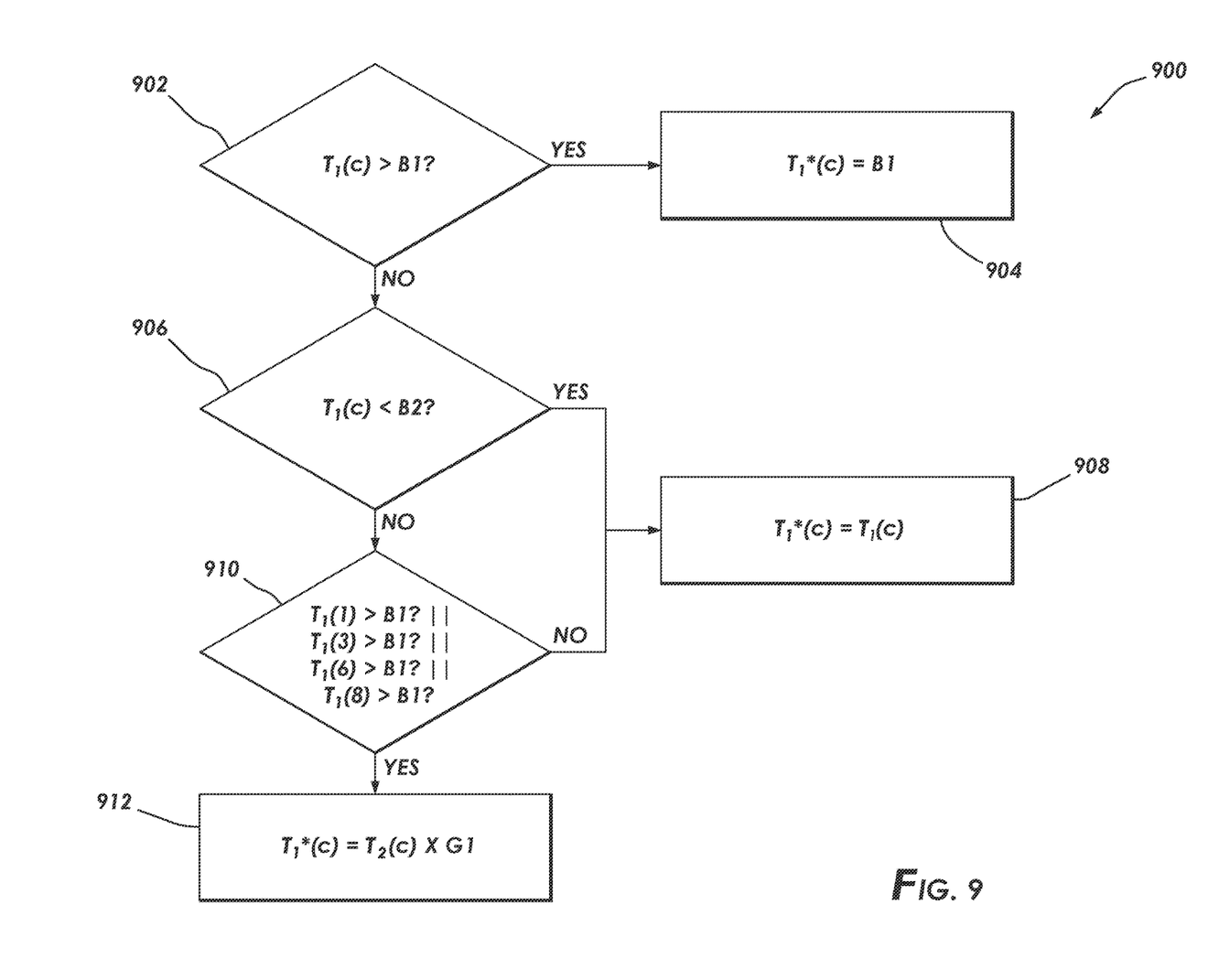
FIG. 9 is a flow diagram of an example of a method for determining a long exposure corrected signal value for an image sensor pixel with noise filtering in accordance with some implementations.

FIG. 9 is a flow diagram of an example of a method 900 for determining the first image value $T_1^*(c)$ for the center pixel in the first time image 502 with noise filtering in accordance with some implementations. For a given pixel array, the method 900 may be performed for one or more pixels in the given pixel array. For simplicity of explanation, the method 900 is depicted in FIG. 9 and described as a series of operations. However, the operations can occur in various orders and/or concurrently, and/or with other operations not presented and described herein.

At block 902, the first pixel signal $T_1(c)$ is compared to the barrier value B1. When the first pixel signal $T_1(c)$ is above than the barrier value B1, the first image value $T_1^*(c)$ is set to the barrier value at block 904. Alternatively, when the first pixel signal $T_1(c)$ is at or below the barrier value B1, the first pixel signal $T_1(c)$ is compared to the noise threshold value B2 at block 906. When the first pixel signal $T_1(c)$ is below the noise threshold value B2, the first image value $T_1^*(c)$ is set to the value of the first pixel signal $T_1(c)$ at block 908. Alternatively, when the first pixel signal $T_1(c)$ is at or above the noise threshold value B2, one or more of the neighboring pixel signals $T_1(1)$, $T_1(2)$, $T_1(3)$, $T_1(4)$, $T_1(5)$, $T_1(6)$, $T_1(7)$, and $T_1(8)$ are compared to the barrier value B1. For example, at block 910, the neighboring pixel signals $T_1(1)$, $T_1(3)$, $T_1(6)$, and $T_1(8)$ of the four neighboring pixels that are positioned diagonally-adjacent to the center pixel are each compared to the barrier value B1. When any of the neighboring pixel signals $T_1(1)$, $T_1(3)$, $T_1(6)$, and $T_1(8)$ are above the barrier value B1, the first image value $T_1^*(1)$ is set as the product of the second pixel signal $T_2(c)$ and the exposure ratio G1 at block 912. Alternatively, when each of the neighboring pixel signals $T_1(1)$, $T_1(3)$, $T_1(6)$, and $T_1(8)$ are at or below the barrier value B1, the first image value $T_1^*(c)$ is set to the first pixel signal $T_1(c)$ at block 908.

Figure 10:
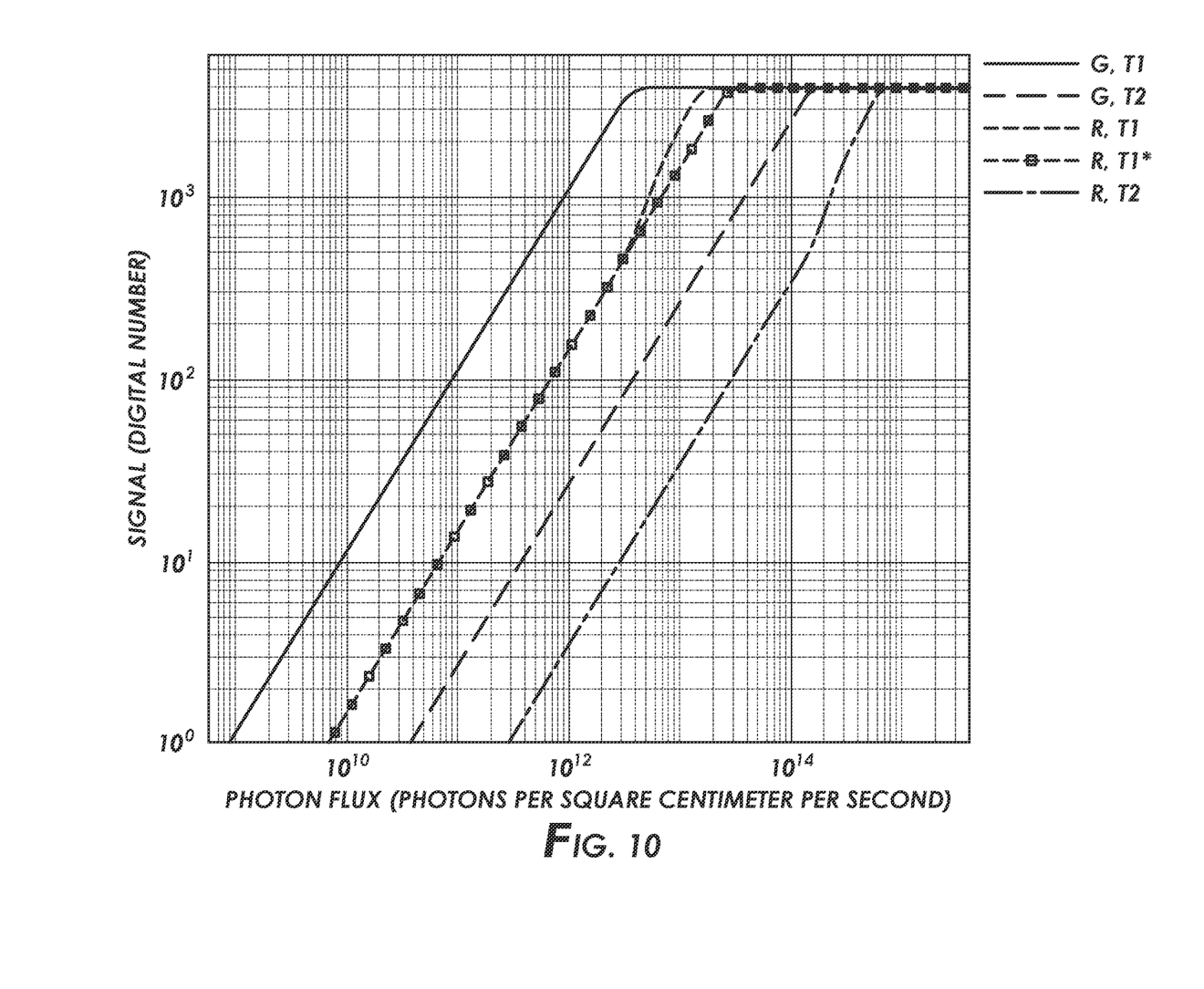
FIG. 10 is a plot of examples of long exposure and short exposure signal values generated by red and green image sensor pixels under green light at different amounts of photon flux in accordance with some implementations.

FIG. 10 illustrates plots of T1 and T2 signals generated by a red pixel and a green pixel of the pixel array 210 under green light at different amounts of photon flux. Photon flux is the number of photons that strike the pixel array 210 during a unit of time. In FIG. 10, the T1 signal generated by the green pixel (referred to herein as the "T1 green pixel signal") increases linearly with photon flux until the T1 green pixel signal reaches the barrier value B1 and is clipped (for example, as described above in relation to block 604 of FIG. 6). Further, in FIG. 10, the T1 signal generated by the red pixel (referred to herein as the "T1 red pixel signal") increases non-linearly with photon flux when the T1 green pixel signal is clipped to the barrier value B1 and the T1 red pixel signal is below the barrier value B1. However, as illustrated in FIG. 10, the T2 signal generated by the red pixel (referred to herein as the "T2 red pixel signal") is linear across the different amounts of photon flux at which the T1 red pixel signal is non-linear. Using the system and methods described herein, the non-linear portion of the T1 red pixel signal is replaced using a portion of the T2 red pixel signal that is proportional to illumination. The result, as illustrated in FIG. 10, is that the first image values for the red pixel increases linearly with photon flux until the T1 red pixel signal reaches the barrier value B1 and is clipped.

Figure 11:
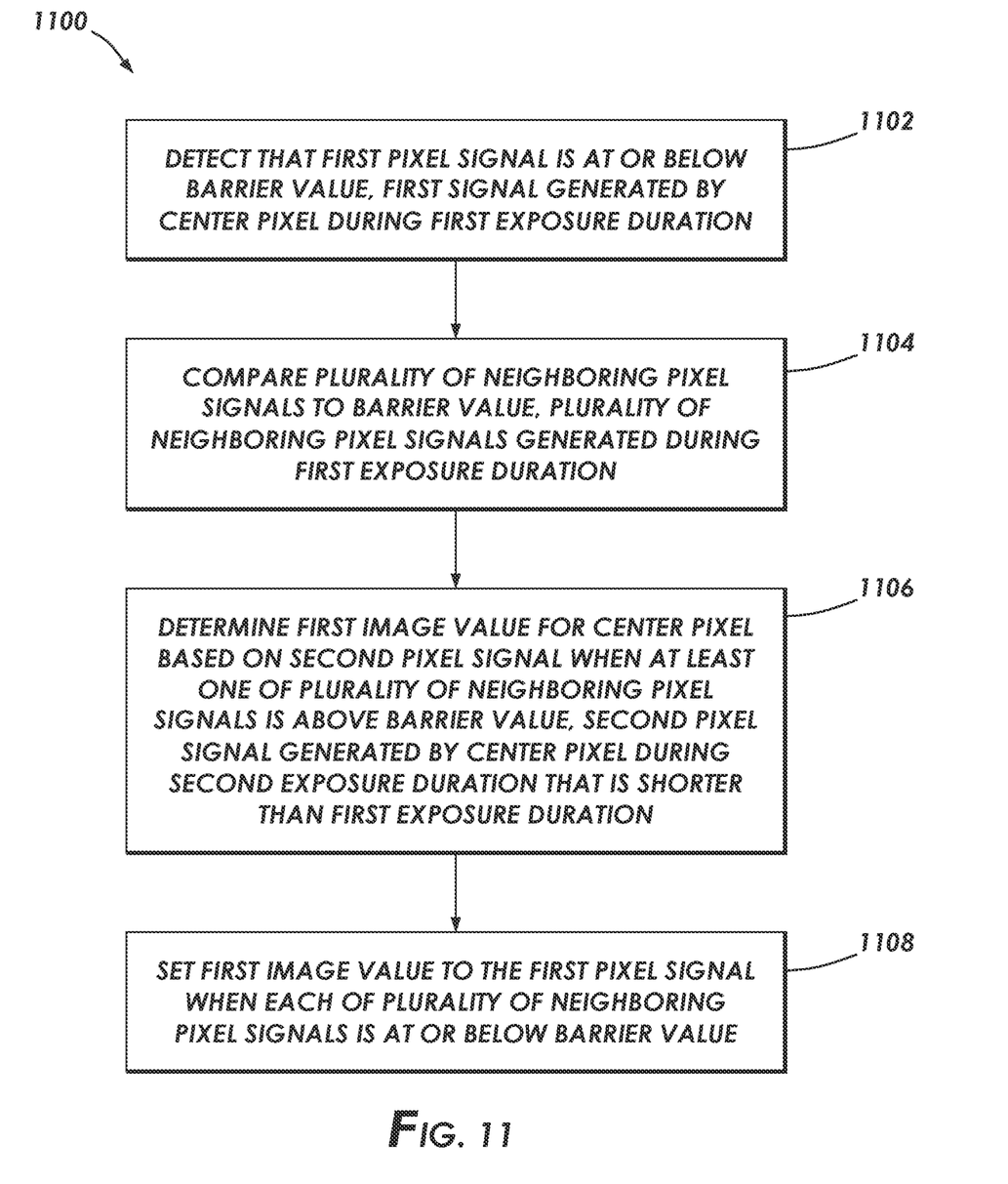
FIG. 11 is a flow diagram of an example of a method for eliminating blooming artifacts in high dynamic range imaging in accordance with some implementations.

FIG. 11 is a flow diagram of an example of a method 1100 for eliminating blooming artifacts in high dynamic range imaging in accordance with some implementations. For simplicity of explanation, the method 1100 is depicted in FIG. 11 and described as a series of operations. However, the operations can occur in various orders and/or concurrently, and/or with other operations not presented and described herein. At block 1102, a first pixel signal is detected as being at or below the barrier value B1. The first pixel signal is generated by a center pixel during a first exposure duration. At block 1104, a plurality of neighboring pixel signals are compared to the barrier value. The plurality of neighboring pixel signals are generated during the first exposure duration. At block 1106, a first image value for the center pixel is determined based on a second pixel signal when at least one of the plurality of neighboring pixel signals is above than the barrier value. The second pixel signal is generated by the center pixel during a second exposure duration that is shorter than the first exposure duration. At block 1108, the first image value is set to the first pixel signal when each of the plurality of neighboring pixel signals is at or below the barrier value. The method 1100 may be performed for one or more additional pixels in a pixel array as the center pixel.

Many of the electrical connections in the drawings are shown as direct couplings having no intervening devices, but not expressly stated as such in the description above. Nevertheless, this paragraph shall serve as antecedent basis in the claims for referencing any electrical connection as "directly coupled" for electrical connections shown in the drawing with no intervening device(s).

The above discussion is meant to be illustrative of the principles and various implementations of the present invention. Numerous variations and modifications will become apparent to those skilled in the art once the above disclosure is fully appreciated. It is intended that the following claims be interpreted to embrace all such variations and modifications.

What is claimed is:

1. An image sensor, comprising:
a pixel array including a plurality of image sensor pixels; and
a controller configured to:
for one or more of the plurality of image sensor pixels:
detect that a first pixel signal is at or below a barrier value, the first pixel signal generated by a pixel of the plurality of image sensor pixels during a first exposure duration, the pixel being a center pixel,
compare a plurality of neighboring pixel signals to the barrier value, the plurality of neighboring pixel signals generated during the first exposure duration, and
determine a first image value for the center pixel based on a second pixel signal when at least one of the plurality of neighboring pixel signals is above the barrier value, the second pixel signal generated by the center pixel during a second exposure duration that is shorter than the first exposure duration.

2. The image sensor of claim 1, wherein, to determine the first image value based on the second pixel signal, the controller is further configured to set the first image value to a product of the second pixel signal and an exposure ratio between the second exposure duration and the first exposure duration.

3. The image sensor of claim 1, wherein the controller is further configured to:
compare the first pixel signal to a noise threshold value that is less than the barrier value, and
set the first image value to the first pixel signal when the first pixel signal is below the noise threshold value.

4. The image sensor of claim 1, wherein the controller is further configured to set the first image value to the first pixel signal when each of the plurality of neighboring pixel signals is at or below the barrier level.

5. The image sensor of claim 1, wherein the plurality of neighboring pixel signals is generated by image sensor pixels that are positioned adjacent to the center pixel on a row or a column of the pixel array.

6. The image sensor of claim 1, wherein the plurality of neighboring pixel signals is generated by image sensor pixels that are positioned diagonally-adjacent to the center pixel.

7. The image sensor of claim 1, wherein the controller is further configured to generate a high dynamic range image based on the first image value for each of the one or more of the plurality of image sensor pixels.

8. The image sensor of claim 1, wherein the controller is further configured to read out the first pixel signal, the second pixel signal, and the plurality of neighboring pixel signals.

9. An imaging system, comprising:
a lens system;
an image sensor in operational relationship with the lens system and comprising a pixel array including a plurality of image sensor pixels; and
an imaging controller configured to:
for one or more of the plurality of image sensor pixels:
detect that a first pixel signal is at or below a barrier value, the first pixel signal generated by a center pixel during a first exposure,
compare a plurality of neighboring pixel signals to the barrier value, the plurality of neighboring pixel signals generated during the first exposure,
determine a first image value for the center pixel based on a second pixel signal when at least one of the plurality of neighboring pixel signals is above the barrier value, the second pixel signal generated by the center pixel during a second exposure that is less than the first exposure, and
set the first image value to the first pixel signal when each of the plurality of neighboring pixel signals is at or below the barrier value.

10. The imaging system of claim 9, wherein, to determine the first image value based on the second pixel signal, the imaging controller is further configured to set the first image value to a product of the second pixel signal and an exposure ratio between the second exposure and the first exposure.

11. The imaging system of claim 9, wherein the imaging controller is further configured to:
   compare the first pixel signal to a noise threshold value that is less than the barrier value, and
   set the first image value to the first pixel signal when the first pixel signal is below the noise threshold value.

12. The imaging system of claim 9, wherein the plurality of neighboring pixel signals are generated by two of the plurality of image sensor pixels that are positioned next to the center pixel on a row or a column of the pixel array.

13. The imaging system of claim 9, wherein the plurality of neighboring pixel signals are generated by four of the plurality of image sensor pixels that are positioned diagonally-adjacent to the center pixel.

14. The imaging system of claim 9, wherein the plurality of neighboring pixel signals are generated by eight of the plurality of image sensor pixels that are positioned around the center pixel.

15. The imaging system of claim 9, wherein the imaging controller is further configured to generate a high dynamic range image based on the first image value for each of the one or more of the plurality of image sensor pixels.

16. The imaging system of claim 9, wherein the imaging controller is further configured to receive the first pixel signal, the second pixel signal, and the plurality of neighboring pixel signals from the image sensor.

17. A method for eliminating blooming artifacts in high dynamic range imaging, the method comprising:
   for one or more of a plurality of image sensor pixels included in a pixel array:
      detecting that a first pixel signal is at or below a barrier value, the first pixel signal generated by a center pixel during a first exposure duration;
      comparing a plurality of neighboring pixel signals to the barrier value, the plurality of neighboring pixel signals generated during the first exposure duration;
      determining a first image value for the center pixel based on a second pixel signal when at least one of the plurality of neighboring pixel signals is above the barrier value, the second pixel signal generated by the center pixel during a second exposure duration that is shorter than the first exposure duration; and
      setting the first image value to the first pixel signal when each of the plurality of neighboring pixel signals is at or below the barrier value.

18. The method of claim 17, wherein determining the first image value based on the second pixel signal further includes setting the first image value to a product of the second pixel signal and an exposure ratio between the second exposure duration and the first exposure duration.

19. The method of claim 17, further comprising:
   comparing the first pixel signal to a noise threshold value that is less than the barrier value; and
   setting the first image value to the first pixel signal when the first pixel signal is below the noise threshold value.

20. The method of claim 17, wherein the method further comprises generating a high dynamic range image based on the first image value for each of the one or more of the plurality of image sensor pixels.

* * * * *